Feb. 27, 1934.　　　E. G. HOLTHAUS　　　1,948,662
OIL BURNING HEATER
Filed March 11, 1932
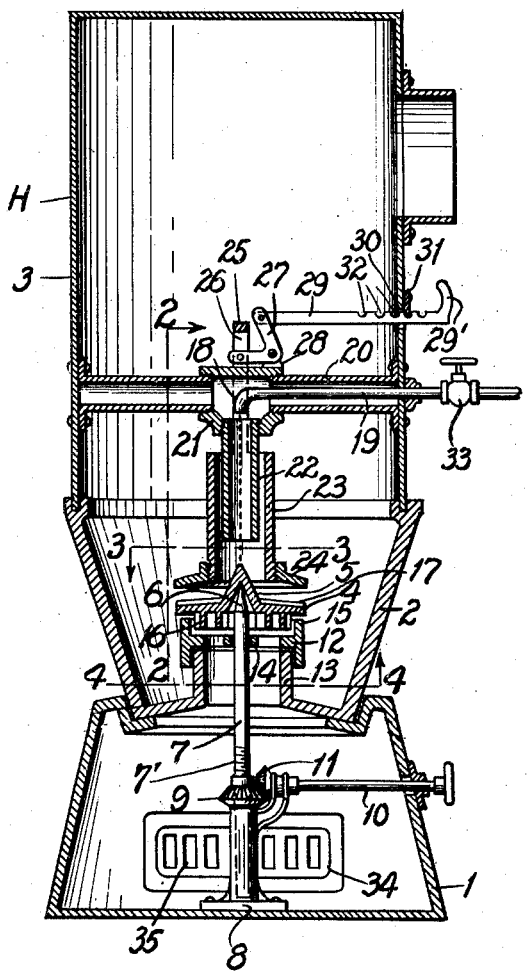
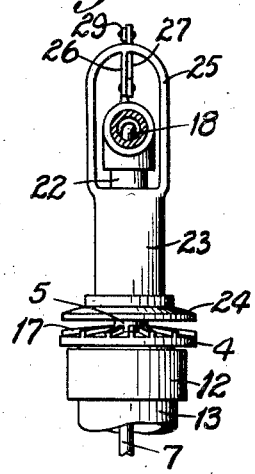
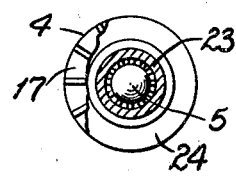
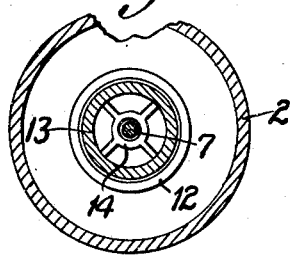
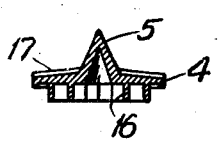
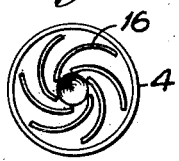
INVENTOR:
ELMO G. HOLTHAUS
BY Harry A. Beimer
ATTORNEY.

Patented Feb. 27, 1934

1,948,662

UNITED STATES PATENT OFFICE 1,948,662

OIL BURNING HEATER

Elmo G. Holthaus, St. Louis, Mo.

Application March 11, 1932. Serial No. 598,219

2 Claims. (Cl. 158—53)

My invention has relation to improvements in oil burning heaters and it consists in the novel features of construction more fully set forth in the specification and pointed out in the claims.

The invention embodies a heater having a fire box in which is disposed a rotary disc burner adapted to be actuated by the natural draft through the heater, the disc when so actuated serving to distribute the fuel in an atomized condition around the periphery of the burner where it is commingled with the air and atomized.

The principal object of the invention is to provide a heater wherein the atomization is so completely done that cheap grades of fuel may be used without excess carbonization.

A further object of the invention is to provide a heater wherein the fuel may be fed to the burner under low pressure and one wherein forced draft is unnecessary to effect the desired degree of combustion. These advantages are obtained by the novel rotatory burner which serves to commingle the atomized fuel with the flow of air induced by the natural draft of the heater, all of this air being caused to issue from the periphery of said burner. A further advantage of the invention is its simplicity of construction and the absence of expensive accessories, such as, motors and fans, because of which it may be manufactured and sold at a comparatively low cost. Further and other advantages will be better apparent from a detailed description of the invention in connection with the accompanying drawing, in which:

Figure 1 is a vertical middle longitudinal section taken through the heater, parts of the apparatus, however, being left in elevation; Fig. 2 is a vertical longitudinal section taken on the line 2—2 of Fig. 1, the burner, however, being shown in elevation; Fig. 3 is a horizontal cross-section taken on the line 3—3 of Fig. 1; Fig. 4 is a horizontal cross-section taken on the line 4—4 of Fig. 1; Fig. 5 is a vertical cross-section taken through the middle of the burner distributing head; and Fig. 6 is a bottom plan of said burner distributing head.

Referring to the drawing, H represents a heater embodying my invention, said heater comprising a base 1 on which is mounted a fire pot 2, said fire pot in turn supporting the heating drum 3. In the event the invention is applied to a hot water or steam boiler the fire pot 2 is replaced by a fire pot 2' having a water jacket embodied in it, said fire pot 2' supporting and communicating with a water jacket section 3'.

The invention is primarily directed to the burner apparatus within the heater, said apparatus comprising a fuel distributing head 4 having a hollow center cone 5 for receiving the tapererd extremity 6 of an adjustable supporting standard 7. The standard 7 may embody any desirable features for enabling it to be adjusted vertically, and for the purpose of this description I show said standard in the form of a lifting jack; that is, a base 8 is provided on which an internally threaded beveled gear 9 is mounted for cooperating with the threads 7' on the standard to raise and lower the same when the gear 9 is rotated by means of the shaft 10 and pinion 11 meshing with the said gear 9. A spider 12 is mounted on the inner end of a flue 13 formed integrally with the fire pot 2 and projecting into said fire pot, said spider having a center hub 14 to serve as a guide for the standard 7 and having an upwardly projecting peripheral flange 15 over which the margin of the distributing head 4 extends. A plurality of spiral vanes 16 are formed on the bottom surface of the distributing head 4 and a plurality of radial oil distributing grooves 17 are formed on the top surface of the head 4 so that the fuel oil issuing from nozzle 18 of fuel pipe 19 will drop onto the apex of the cone 5 and run down over said cone to the grooves 17 which will distribute the fuel entirely around the periphery of the head 4.

In order to prevent ignition of the oil under the nozzle 18 of the fuel pipe, said pipe is enclosed in a tubular housing 20, at the center of which is a T-connection 21 which carries a downwardly projecting tubular branch 22. The downwardly extending tube 22 prevents air from mixing with the oil throughout its full extent and, of course, prevents combustion of the oil above the distributing head 4. A tubular guard 23 is disposed around the branch pipe 22 and has a flange 24 on its lower end, the said flange being disposed immediately above the distributing head 4, the cone 5 of which enters the tubular guard 23. The upper end of the tubular guard 23 is provided with a bail 25, said bail having a lug 26 extending downwardly from the top thereof to which is connected one arm of a bell-crank lever 27 pivotally mounted on the lug 28 projecting upwardly from the T 21. The bell-crank lever 27 has a rack bar 29 connected to its up-standing arm, said bar passing through an opening 30 in the wall of the drum 3, on the outside of which is a keeper 31 which may be caused to enter one of the series of notches 32 on the bar for the purpose of rocking the bell-crank lever 27 whereby the tubular guard 23 is either raised or lowered.

To facilitate the vertical adjustment of the tubular guard 23 in this manner, the outer end of the rack bar 29 is provided with a handle 29'. A valve 33 is disposed in the pipe 19 for the purpose of regulating the quantity of oil that is allowed to drip from the nozzle 18.

A door 34 is disposed in the base 1 and is provided with a conventional window damper 35 for regulating the quantity of air that is allowed to pass through the heater. When the windows in the damper 35 are open a draft will pass upwardly through the flue 13 and through the spider 12, after which the air currents will impinge on the vanes 16 on the under side of the distributing head 4 causing said head to revolve upon the tapered extremity 6 of the standard 7. At the same time the valve 33 has been opened to permit oil to drip from the nozzle 18 onto the apex of the cone 5, said oil being spread over the surface of this cone on account of the rotation thereof and entering the distributing slots 17, from which the oil is thrown outwardly by the centrifugal force of the rotating distributing head. We will assume that the oil has been ignited by a pilot light, or other convenient device, after which the tubular guard 23 is adjusted with respect to the head 4 so as to confine the air of combustion issuing from beneath the edge of the disc 4 to the immediate vicinity of said edge. Obviously, a proper adjustment of the space between the head 4 and the flange 24 will operate as a shield, preventing sufficient air from entering this space to produce combustion of the oil therein. As the head 4 rotates under the impetus of the air currents impinging on the vanes 16 it causes the air issuing from beneath it to swirl rapidly, and at the same time throws outwardly the oil vapor that has been formed by the heat in the fire box 2. Thus, a very complete mixing of oil vapor and air is effected around the margin of the distributing head 4 and an intense cone-shaped flame produced.

The standard 7 may be raised or lowered to raise or lower the head 4 and thereby vary the space through which the air discharges, which in turn serves to regulate the speed of the distributing head. Thus adjustment of the head may be made until the best conditions for complete combustion are attained.

The construction of my improved burner, together with the various adjustments that may be effected, enable me to burn almost any kind of liquid fuel with a minimum amount of carbonization and a maximum amount of heat.

The balancing of the distributing head 4 on the point of the standard 7 as a fulcrum reduces the friction on the point of rotation to a minimum so that a small quantity of air impinging on the vanes will rotate this head, and even though occasional irregularities in the draft may oscillate the distributing head it will always return to its horizontal position.

Having described my invention, I claim:

1. A heater having a combustion chamber provided with an air inlet, a burner disposed adjacent to said air inlet, said burner comprising an element having a marginal flange around the air inlet, a rotatory air and fuel distributing head in close proximity to said flange, said head having propelling vanes projecting downwardly inside said flange, air shielding means immediately above the distributing head, and means for feeding fuel to the distributing head.

2. A heater having a combustion chamber provided with an air inlet flue, a burner mounted in said combustion chamber, said burner comprising a rotatably mounted fuel distributing head in close proximity to said flue and an air shield above said distributing head, means for vertically adjusting the distributing head relative to the flue, means for vertically adjusting the shield relative to the head, and means for feeding fuel onto the upper surface of said head.

ELMO G. HOLTHAUS.